US007542775B2

(12) United States Patent
Sato et al.

(10) Patent No.: US 7,542,775 B2
(45) Date of Patent: Jun. 2, 2009

(54) CONTROL DEVICE AND RADIO CONTROL METHOD

(75) Inventors: Takuya Sato, Yokohama (JP); Minami Ishii, Yokohama (JP); Takehiro Nakamura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 10/560,731

(22) PCT Filed: Jun. 16, 2004

(86) PCT No.: PCT/JP2004/008454

§ 371 (c)(1),
(2), (4) Date: Dec. 15, 2005

(87) PCT Pub. No.: WO2004/112282

PCT Pub. Date: Dec. 23, 2004

(65) Prior Publication Data

US 2007/0010277 A1    Jan. 11, 2007

(30) Foreign Application Priority Data

Jun. 16, 2003   (JP) .............................. 2003-170886

(51) Int. Cl.
*H04B 7/00* (2006.01)
*H04B 1/00* (2006.01)
(52) U.S. Cl. .......................... 455/522; 455/69; 455/126
(58) Field of Classification Search ................... 455/69, 455/522, 67.11, 126, 226.1
See application file for complete search history.

(56) References Cited

U.S. PATENT DOCUMENTS 6,594,468 B1 *   7/2003   Ramanathan .................. 455/7
6,650,905 B1 *  11/2003   Toskala et al. .............. 455/522
2001/0036810 A1 * 11/2001  Larsen ....................... 455/11.1
2001/0050909 A1 * 12/2001  Taketsugu .................... 370/329
2002/0082036 A1 *  6/2002  Ida et al. .................... 455/522
2003/0003942 A1 *  1/2003  Okumura .................... 455/522
2003/0068975 A1 *  4/2003  Qiao et al. .................. 455/11.1

(Continued)

FOREIGN PATENT DOCUMENTS

EP           0 847 147        6/1998

(Continued)

*Primary Examiner*—Quochien B Vuong
(74) *Attorney, Agent, or Firm*—Oblon, Spivak, McClelland, Maier & Neustadt, P.C.

(57) ABSTRACT

A controller equipment includes a measuring unit for measuring channel qualities of a control channel and a user channel separated from a received signal, an updating unit for updating target circuit qualities for the control channel and the user channels, based on results of measurement of the channel qualities by the measuring units, a communicating unit for communicating, in a predetermined period, the updated target circuit qualities for the control channel and the user channel, and a target circuit quality determining unit for determining a target circuit quality for the received signal, based on the target circuit qualities for the control channel and the user channel communicated from the communicating unit, so that all of the control channel and user channels satisfy a required channel quality. When the channel quality of the control channel satisfies a predetermined condition, the communicating unit communicates at least the target circuit quality for the control channel, and the target circuit quality determining unit determines a target circuit quality for the received signal, based on the communicated target circuit quality for the control channel.

9 Claims, 8 Drawing Sheets

U.S. PATENT DOCUMENTS

2004/0005906 A1 * 1/2004 Okumura et al. ............ 455/522

FOREIGN PATENT DOCUMENTS

| | | |
|---|---|---|
| EP | 1 168 657 | 1/2002 |
| JP | 08-125604 | 5/1996 |
| JP | 2002-016545 | 1/2002 |
| JP | 2002-051007 | 2/2002 |
| JP | 2003-018090 | 1/2003 |
| JP | 2003-078484 | 3/2003 |

* cited by examiner

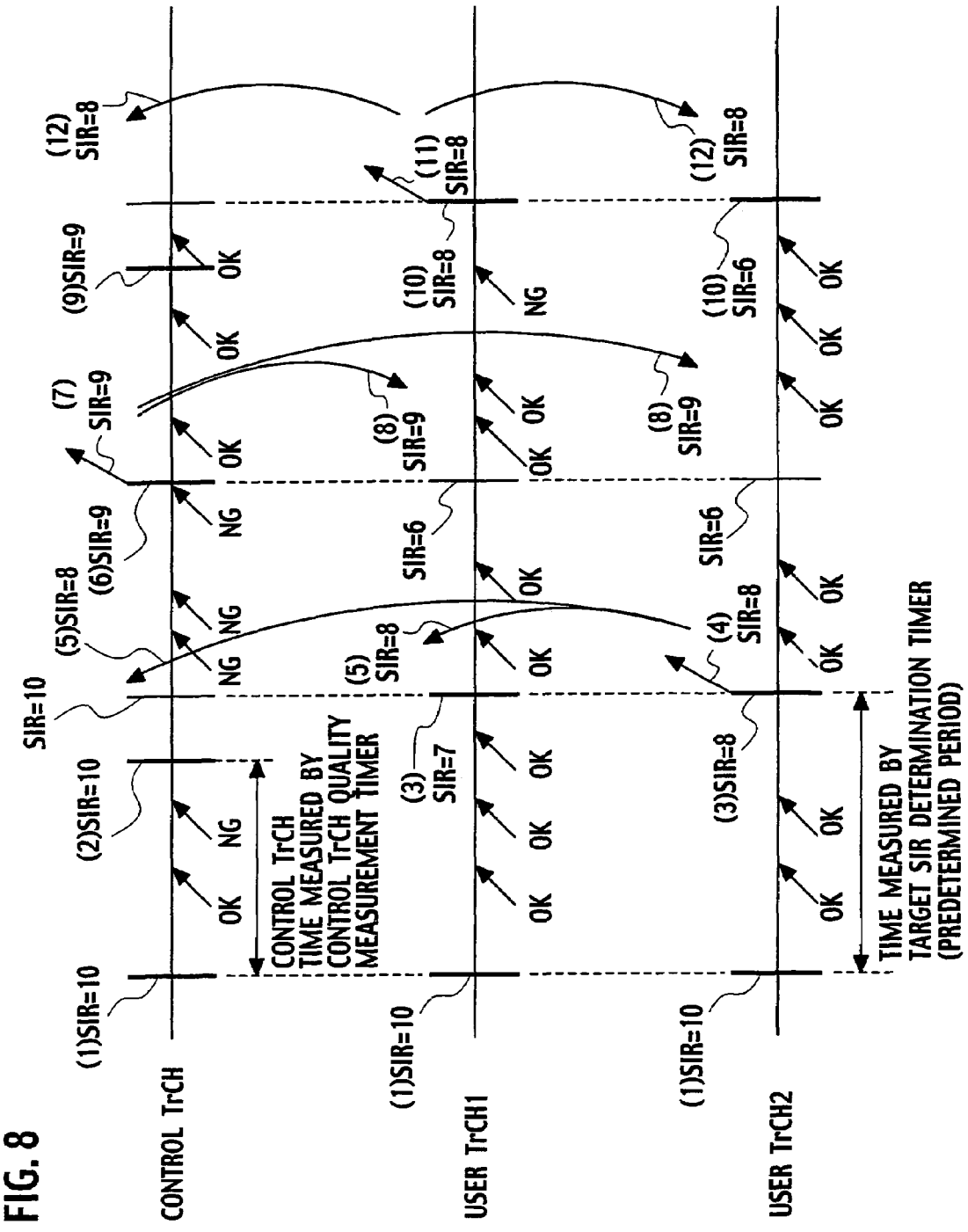

CONTROL DEVICE AND RADIO CONTROL METHOD

TECHNICAL FIELD

The present invention relates to a controller equipment and a radio communication method for implementing a transmit power control method in a radio communication system using a CDMA system or the like.

BACKGROUND ART

Transmit power control methods in radio communication systems using a CDMA system or the like have been known in which transmit power at a transmitter is controlled so as to make received power at a receiver constant even when fluctuations in the propagation path occur.

As a first transmit power control method, a closed loop transmit power control method is known in which a receiver compares a measured desired wave to interference wave power ratio (SIR) to a desired SIR, and sets transmit power control bits based on a result of the comparison.

As a second transmit power control method, an outer loop transmit power control method is known in which a receiver compares a measured receive error rate of a received signal to a preset target receive error rate, corrects a target SIR based on a result of the comparison, and sets transmit power control bits based on the corrected target SIR.

As a third transmit power control method, a closed loop transmit power control method is known in which a receiver selects a data piece which requires the highest data quality from among the data pieces included in a received signal, and controls target circuit quality (target SIR) so that the data quality of the selected data piece is satisfied. By using this closed loop transmit power control method, even when a plurality of data pieces requiring different data qualities are multiplexed on the same channel, transmit power control can be properly performed.

With reference to FIG. 1, a radio communication system for implementing the above-described third transmit power control method will be described. For a radio control station shown in FIG. 1, a radio control station 3 is provided with main functions of outer loop transmit power control, and a base station 2 is provided with main functions of closed loop transmit power control.

As shown in FIG. 1, the base station 2 is configured with an amplifier unit 21, a demodulator unit 25, a modulator unit 22, a frame generating unit 23, a pattern determining unit 24, and a SIR measuring unit 26.

The amplifier unit 21 is configured to amplify a signal received from a mobile station 1 for output. The amplifier unit 21 is also configured to amplify a spread signal outputted from the modulator unit 22 to a certain output for transmission to the mobile station 1.

The modulator unit 22 is configured to perform data modulation processing and spread modulation processing on a transmission frame outputted from the frame generating unit 23 for output to the amplifier unit 21.

The frame generating unit 23 is configured to add transmit power control bits determined by the pattern determining unit 24 to data bits to be transmitted, thereby forming a transmission frame.

The pattern determining unit 24 is configured to determine a transmit power control bit pattern, based on a SIR measured by the SIR measuring unit 26 and a stored target SIR. Here, a target SIR stored is periodically communicated from the radio control station 3.

The demodulator unit 25 is configured to perform despread demodulation processing and data demodulation processing on a signal outputted from the amplifier unit 21 for output to the SIR measuring unit 26 and the radio control station 3. The SIR measuring unit 26 is configured to measure a SIR based on a signal outputted from the demodulator unit 25.

The radio control station 3 is configured with a transport channel (TrCH) separating unit 31, channel (CH) quality measuring units 321 to 32$n$, transport channel target SIR updating units 331 to 33$n$, and a target SIR determining unit 34.

The transport channel separating unit 31 is configured to separate a plurality of transport channels from a signal outputted from the demodulator unit 25 of the base station 2.

The channel quality measuring units 321 to 32$n$ are configured to measure the channel qualities of the separated transport channels.

The transport channel target SIR updating units 331 to 33$n$ are configured to compare channel qualities measured by the channel quality measuring units 321 to 32$n$ with preset target channel qualities for respective transport channels, and to update target SIRs for the respective transport channels.

Also, the transport channel target SIR updating units 331 to 33$n$ are configured to update the target SIRs for the respective transport channels, based on the target SIR communicated from the target SIR determining unit 34.

The target SIR determining unit 34 is configured to compare the updated target SIRs for the respective transport channels, and to determine a target SIR which satisfies the channel qualities of all transport channels for communication to the base station 2.

At the same time, the target SIR determining unit 34 is configured to communicate the determined target SIR to the respective transport channel target SIR updating units 331 to 33$n$.

In some cases, in the conventional radio communication system shown in FIG. 1, the radio control station 3 communicates the determined target SIR to the base station 2 in predetermined periods, not in real time, for the purposes of reducing the load of the radio control station 3 and reducing the circuit capacity between the radio control station 3 and the base station 2.

The conventional radio communication system, however, has the problem that when user transport channels and a control transport channel are multiplexed into a signal, even if a receive error occurs in the control transport channel, for example, a target SIR is not improved until a predetermined period comes, and there is the possibility that a long predetermined period can prevent flow of control data and establishment of communication.

The present invention has been made in view of the above problems, and has an object of providing a controller equipment and a radio communication method with which, in the case where a radio control station communicates a target SIR in outer loop transmit power control to a base station in predetermined periods, not in real time, an adequate circuit quality can be maintained with a minimum increase in the load of the radio control station and a minimum increase in the circuit capacity between the radio control station and the base station.

DISCLOSURE OF THE INVENTION

A first aspect of the present invention is summarized as a controller equipment including: a measuring unit configured to measure channel qualities of a control channel and a user channel separated from a received signal; an updating unit configured to update target circuit qualities for the control channel and the user channel, based on results of measurement of the channel qualities by the measuring units; a communicating unit configured to communicate, in a predetermined period, the updated target circuit qualities for the control channel and the user channel; and a target circuit quality determining unit configured to determine a target circuit quality for the received signal, based on the target circuit qualities for the control channel and the user channel communicated from the communicating unit, so that all of the control channel and the user channel satisfy required channel qualities. When the channel quality of the control channel satisfies a predetermined condition, the communicating unit is configured to communicate at least the target circuit quality for the control channel to the target circuit quality determining unit. The target circuit quality determining unit is configured to determine the target circuit quality for the received signal, based on the communicated target circuit quality for the control channel.

In the first aspect, the communicating unit can be configured to compare the channel quality of the control channel with a predetermined threshold in a period shorter than the predetermined period, and to communicate the updated target circuit quality for the control channel to the target circuit quality determining unit based on a result of the comparison.

In the first aspect, when the channel quality of the control channel satisfies a predetermined condition, the communicating unit can be configured to communicate the target circuit qualities for the control channel and the user channel to the target circuit quality determining unit; and the target circuit quality determining unit can be configured to determine the target circuit quality for the received signal, based on the communicated target circuit qualities for the control channel and the user channel.

BRIEF DESCRIPTION OF DRAWINGS

FIG. 8 is a transition diagram illustrating an example of update transitions of a target SIR for respective transport channels in the second embodiment of the present invention.

BEST MODE FOR CARRYING OUT THE INVENTION

First Embodiment

Figure 1:
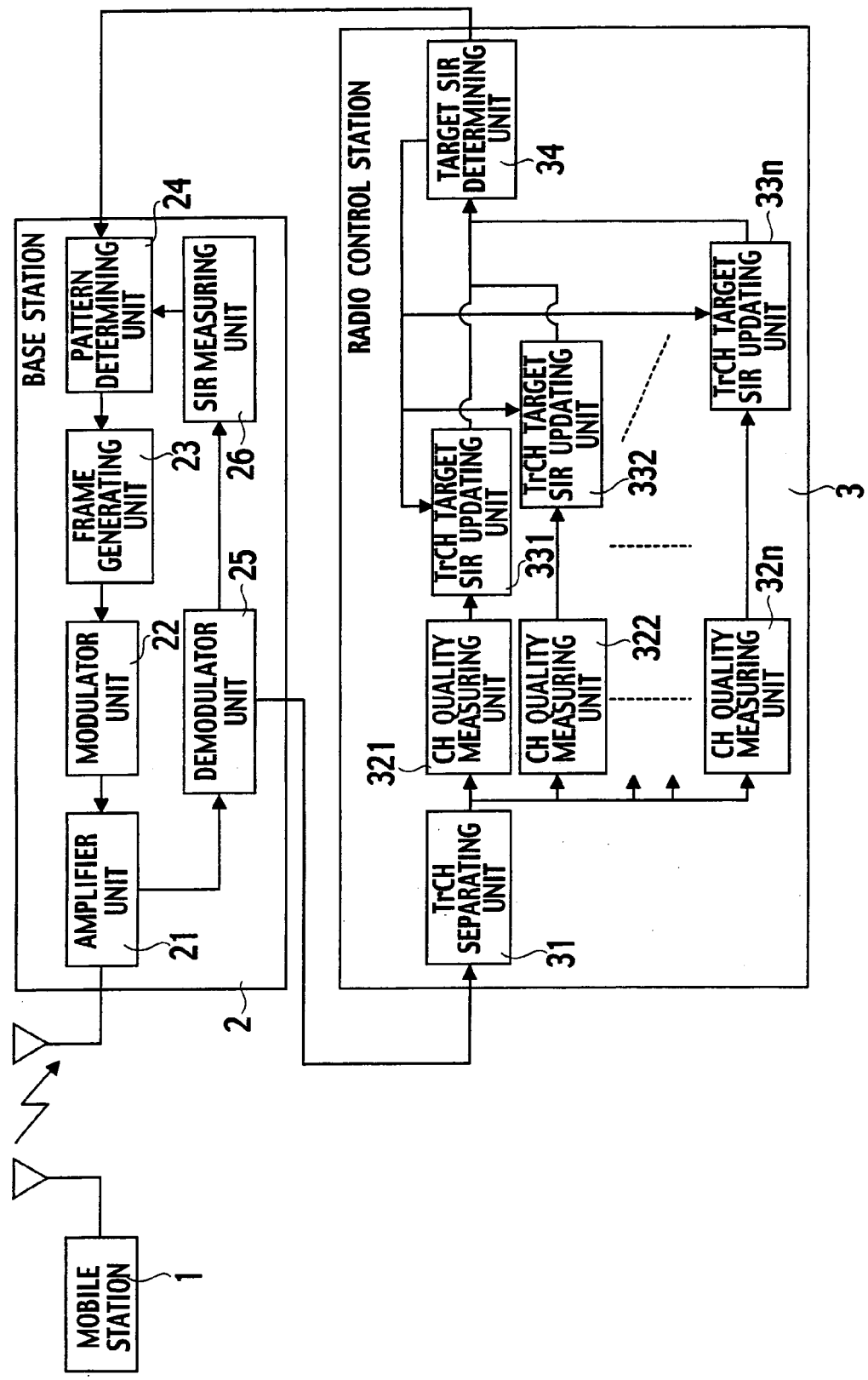
FIG. 1 is a functional block diagram showing the configuration a radio communication system according to a related art.
Figure 2:
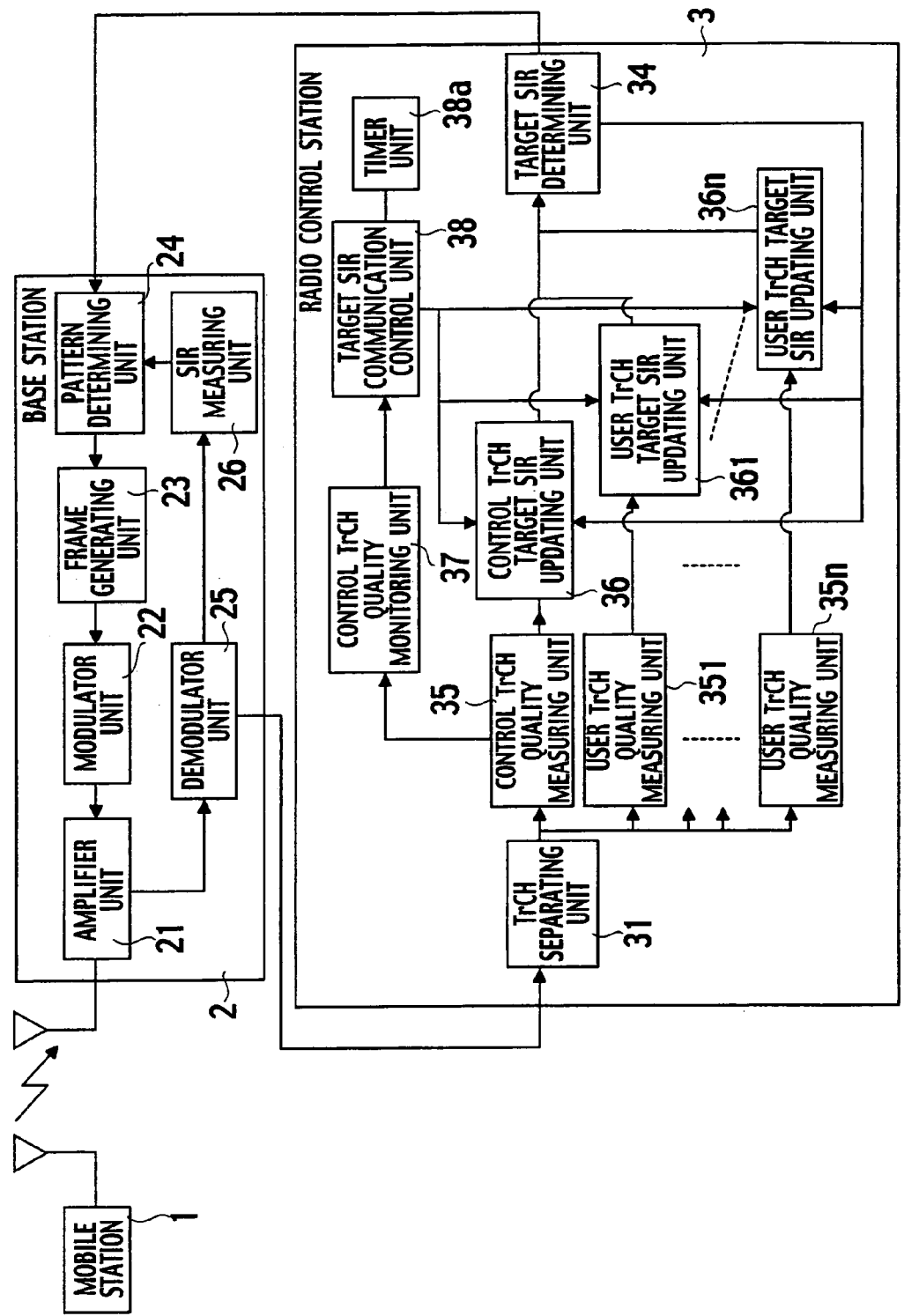
FIG. 2 is a functional block diagram showing the configuration of a radio communication system according to a first embodiment of the present invention.

Hereinafter, with reference to the drawings, a first embodiment of the present invention will be described in detail. FIG. 2 is a functional block diagram showing the configuration of a radio communication system in this embodiment. As shown in FIG. 2, the radio communicating system of this embodiment includes a mobile station 1, a base station 2, and a radio control station 3.

As shown in FIG. 2, the radio control station 3 is a controller equipment provided with a transport channel (TrCH) separating unit 31, a control transport channel (TrCH) quality measuring unit 35, user transport channel (TrCH) quality measuring units 351 to 35n, a control transport channel (TrCH) target SIR updating unit 36, user transport channel (TrCH) SIR updating units 361 to 36n, a target SIR determining unit 34, a control transport channel quality monitoring unit 37, a target SIR communication control unit 38, and a timer unit 38a.

The transport channel separating unit 31 is configured to separate a control transport channel and a plurality of user transport channels from a signal (received signal) outputted from a demodulator unit 25 of the base station 2.

Here, a control transport channel is a control channel for transmitting control data, and a user transport channel is a user channel for transmitting one kind of user data. Through a transport channel, one kind of data (control data or user data) is transmitted. Multiple transport channels are multiplexed into a signal for transmission.

The control transport channel quality measuring unit 35 is configured to measure the channel quality of a control transport channel separated by the transport channel separating unit 31.

The user transport channel quality measuring units 351 to 35n are configured to measure the channel qualities of user transport channels separated by the transport channel separating unit 31.

In this embodiment, as the "channel quality", the number of CRC-NGs, the number of block errors, the number of bit errors or the like is used, for example. ACRC is a signal for reporting on whether or not a received quality in a transport channel meets a predetermined condition.

The control transport channel target SIR updating unit 36 is configured to update a target SIR (target circuit quality) for a control channel, based on a result of measurement of the channel quality (e.g., the number of CRC-NGs) by the control transport channel quality measuring unit 35.

Specifically, the control transport channel target SIR updating unit 36 is configured to compare a channel quality measured by the control transport channel quality measuring unit 35 with a preset target channel quality for the control transport channel, and to update a target SIR for the control transport channel.

Also, the control transport channel target SIR updating unit 36 is configured to update a target SIR for the control transport channel, based on a target SIR communicated from the target SIR determining unit 34.

For example, when a channel quality measured by the control transport channel quality measuring unit 35 satisfies a target channel quality for the control transport channel, the control transport channel target SIR updating unit 36 reduces a target SIR for the control transport channel.

On the other hand, when a channel quality measured by the control transport channel quality measuring unit 35 does not satisfy a target channel quality for the control transport channel, the control transport channel target SIR updating unit 36 increases a target SIR for the control transport channel.

Also, the control transport channel target SIR updating unit 36 communicates an updated target SIR for the control transport channel to the target SIR determining unit 34, in accordance with an instruction from the target SIR communication control unit 38.

The user transport channel target SIR updating units 361 to 36n are configured to update target SIRs (target circuit qualities) for the user channels, based on results of measurement of channel qualities (e.g., the number of CRC-NGs) by the user transport channel quality measuring units 351 to 35n.

Specifically, the user transport channel target SIR updating units 361 to 36n are configured to compare channel qualities measured by the user transport channel quality measuring units 351 to 35n with target channel qualities preset for the user transport channels, and to update target SIRs for the respective user transport channels.

Also, the user transport channel target SIR updating units 361 to 36n are configured to update target SIRs for the user transport channel, based on a target SIR communicated by the target SIR determining unit 34.

For example, when channel qualities measured by the user transport channel quality measuring units 351 to 35n satisfy target channel qualities for the respective user transport channels, the user transport channel target SIR updating units 361 to 36n reduce target SIRs for the respective user transport channel.

On the other hand, when channel qualities measured by the user transport channel quality measuring units 351 to 35n do not satisfy target channel qualities for the respective user transport channels, the user transport channel target SIR updating units 361 to 36n increase target SIRs for the respective user transport channels.

Also, the user transport channel target SIR updating units 361 to 36n are configured to communicate updated target circuit qualities for the user transport channels to the target SIR determining unit 34, in accordance with an instruction from the target SIR communication control unit 38.

In this embodiment, description will be made on an example of using "SIR" as "circuit quality", but the present invention is not limited thereto, and is also applicable to the case of using "CIR (carrier wave to interference power ratio)", "SNR (desired wave to noise power ratio)", or "CNR (carrier wave to noise power ratio)", for example.

The target SIR determining unit 34 is configured to determine a target SIR for a received signal, based on a target SIR for the control transport channel communicated from the control transport channel target SIR updating unit 36, and target SIRs for the user transport channels communicated from the user transport channel target SIR updating units 361 to 36n, so that all of the control transport channel and the user transport channels satisfy required channel qualities (target channel qualities).

The target SIR determining unit 34 is configured to communicate a determined target SIR for the received signal to the base station 2 in predetermined timing. Also, the target SIR determining unit 34 is configured to communicate a determined target SIR for the received signal to the control transport channel target SIR updating unit 36 and the user transport channel target SIR updating units 361 to 36n.

When the target SIR determining unit 34 selects a target SIR having the largest value (value of the highest quality) from among target SIRs for the control transport channel and the user transport channels, all of the control transport channel and the user transport channels can satisfy their target channel qualities.

The target SIR determining unit 34 may alternatively be configured to select a target SIR having the latest value or the like from among target SIRs for the control transport channel and the user transport channels.

The control transport channel quality monitoring unit 37 is configured to monitor measurement of the control transport channel quality measuring unit 35.

Specifically, when the channel quality of a control transport channel measured by the control transport channel quality measuring unit 35 becomes unable to satisfy a target channel quality for the control transport channel, the control transport channel quality monitoring unit 37 is configured to communicate that fact to the target SIR communication control unit 38.

The target SIR communication control unit 38 is configured to instruct, in a predetermined period (time measured by a target SIR determination timer), the transport channel target SIR updating units 36 and 361 to 36n to communicate current target SIRs for the respective transport channel to the target SIR determining unit 34.

Also, when receiving a communication from the control transport channel quality monitoring unit 37, the target SIR communication control unit 38, even not in the predetermined period, immediately instructs the transport channel target SIR updating units 36 and 361 to 36n to communicate current target SIRs for the respective transport channel to the target SIR determining unit 34.

That is, when the channel quality of a control channel meets a predetermined condition, the control transport channel target SIR updating unit 36 and the user transport channel target SIR updating units 361 to 36n communicate an updated target circuit qualities for the control channel and the user channel to the target SIR determining unit 34 in a period shorter than the predetermined period, according to an instruction from the control transport channel quality monitoring unit 37 and the target SIR communication control unit 38.

The timer unit 38a includes the target SIR determination timer, and is configured to communicate the fact that the predetermined period has come to the target SIR communication control unit 38, when the target SIR determination timer expires.

The base station 2 is an equipment for performing transmission and reception of a signal with the mobile station 1 through a radio communication circuit. Specifically, as shown in FIG. 2, the base station 2 is provided with an amplifier unit 21, a modulator unit 22, a frame generating unit 23, a pattern determining unit 24, the demodulator unit 25, and a SIR measuring unit 26.

The amplifier unit 21 is configured to amplify a signal received from the mobile station 1 for output. The amplifier unit 21 is also configured to amplify a spread signal outputted from the modulator unit 22 to a certain output for transmission to the mobile station 1.

The modulator unit 22 is configured to perform data modulation processing and spread modulation processing on a transmission frame outputted from the frame generating unit 23 for output to the amplifier unit 21.

The frame generating unit 23 is configured to add transmit power control bits determined by the pattern determining unit 24 to data bits to be transmitted, thereby forming a transmission frame.

The pattern determining unit 24 is configured to determine a transmit power control bit pattern, based on a SIR measured by the SIR measuring unit 26 and a stored target SIR. Here, the stored target SIR is communicated from the radio control station 3.

The demodulator unit 25 is configured to perform despread demodulation processing and data demodulation processing on a signal outputted from the amplifier unit 21 for output to the SIR measuring unit 26 and the radio control station 3. The SIR measuring unit 26 is configured to measure a SIR based on a signal outputted from the demodulator unit 25.

The base station 2 may be provided with the functions of the radio control station 3 in this embodiment.

Hereinafter, with reference to FIG. 3, an operation in the radio control station according to this embodiment will be described.

Figure 3:
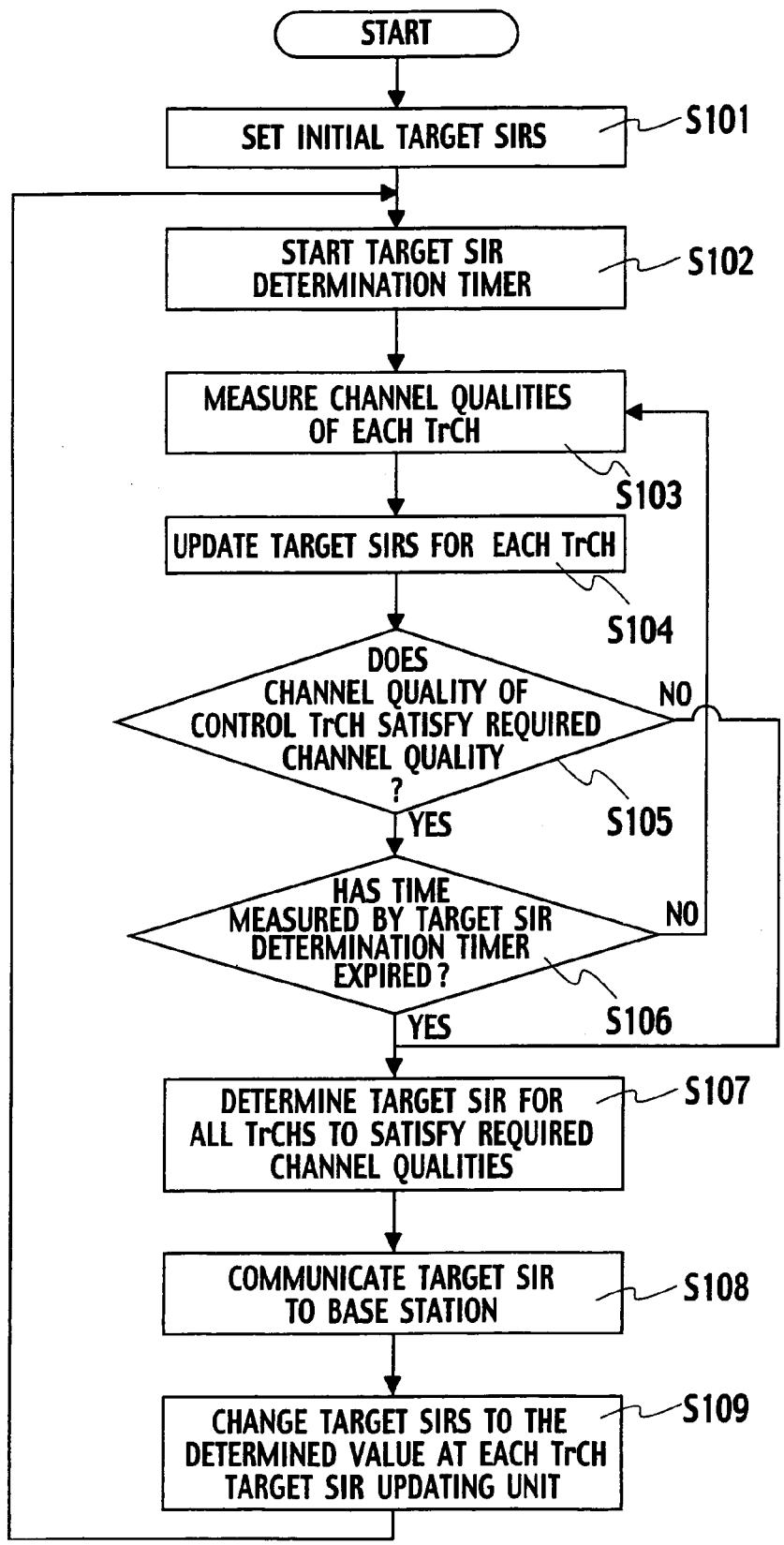
FIG. 3 is a flowchart showing an operation in a radio control station according to the first embodiment of the present invention.

As shown in FIG. 3, in step S101, the transport channel target SIR updating units 36 and 361 to 36n set initial target SIR values. Here, the initial target SIR values to be set are predetermined for the transport channels by parameters.

In step S102, the timer unit 38a starts the target SIR determination timer for monitoring the predetermined period.

In step S103, the transport channel separating unit 31 separates a control transport channel and respective user transport channels from a signal received from the base station 2. The control transport channel quality measuring unit 35 measures the channel quality of the control transport channel. The user transport channel quality measuring units 351 to 35n measure the channel qualities of the respective user transport channels.

In step S104, the control transport channel target SIR updating unit 36 compares the measured channel quality of the control transport channel with a set target channel quality for the control transport channel, and updates the target SIR for the control transport channel.

The user transport channel target SIR updating units 361 to 36n compare the measured channel qualities of the respective user transport channels with set target channel qualities for the respective user transport channels, and update the target SIRs for the respective user transport channels.

In step S105, the control transport channel quality monitoring unit 37 determines whether the measured channel quality of the control transport channel satisfies the target channel quality (required channel quality) or not.

When the determination is yes ("Y" in step S105), the operation proceeds to step S106. When the determination is no ("N" in step S105), the operation proceeds to step S107.

In step S106, the target SIR communication control unit 38 determines whether the time measured by the target SIR determination timer within the timer unit 38a has expired or not, that is, whether the predetermined period has come or not.

When the determination is yes ("Y" in step S106), the operation proceeds to step S107. When the determination is no ("N" in step S106), the operation repeats the process of steps S103 to S106 by loop processing.

In step S107, the target SIR communication control unit 38 instructs the transport channel target SIR updating units 36 and 361 to 36n to immediately communicate current target SIRs for the transport channel to the target SIR determining unit 34. The target SIR determining unit 34 determines a target SIR for a received signal, based on the communicated target SIRs for the respective transport channel, so that the channel qualities of all transport channels satisfy their required channel qualities.

In step S108, the target SIR determining unit 34 communicates the determined target SIR for the received signal to the base station 2, and also communicates the received signal target SIR to the transport channel target SIR updating units 36 and 361 to 36n.

In step S109, the transport channel target SIR updating units 36 and 361 to 36n update the target SIRs for the respective transport channel, based on the communicated target SIR.

Figure 4:
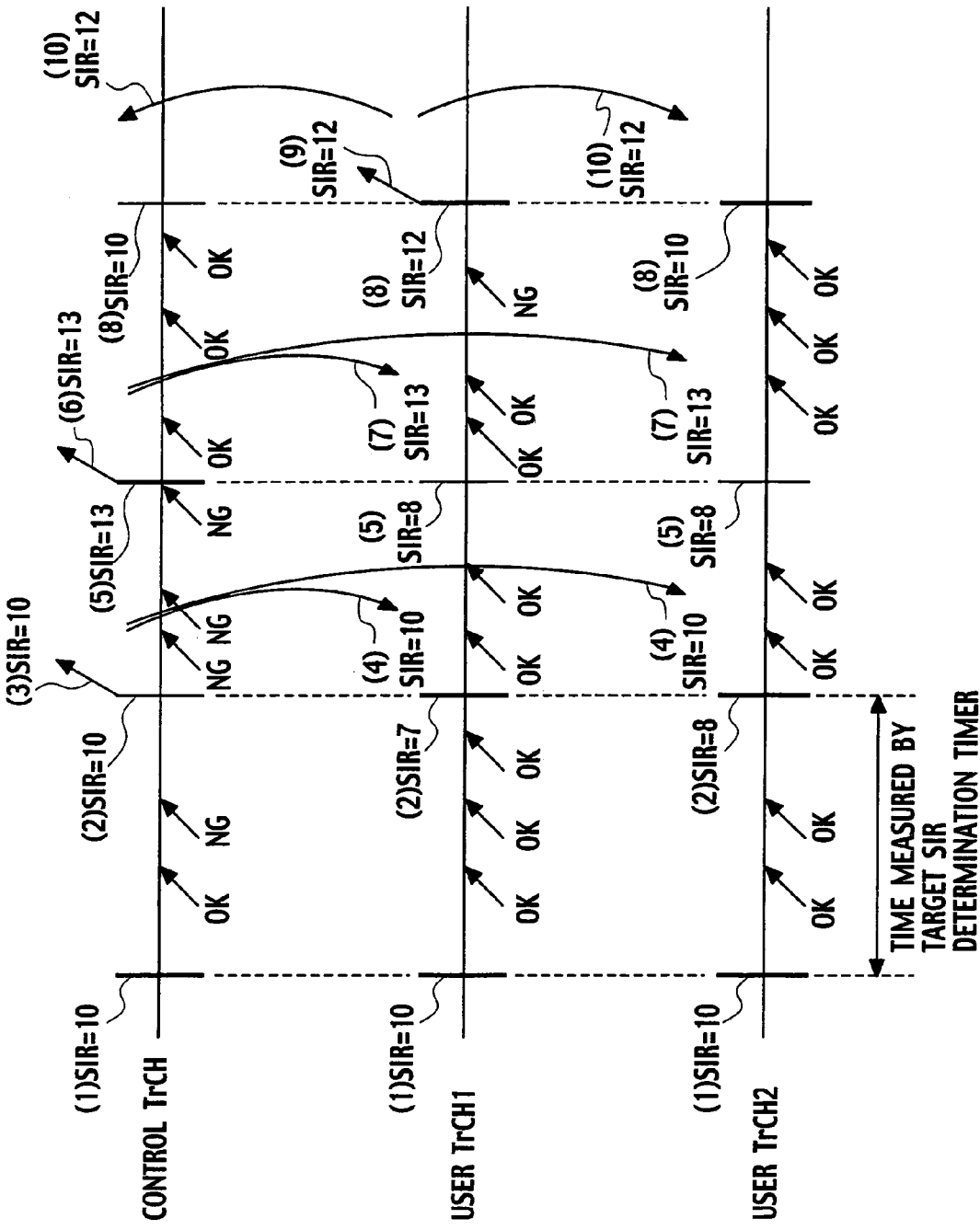
FIG. 4 is a transition diagram illustrating an example of update transitions of a target SIR for respective transport channels in the first embodiment of the present invention.

FIG. 4 illustrates an example of update transitions of target SIRs for the respective transport channel in this embodiment.

FIG. 4 shows the case where one control transport channel and two user transport channels are multiplexed into a received signal.

In the example of FIG. 4, the transport channel target SIR updating units 36 and 361 to 36n reduce the target SIRs for the respective transport channels by 1 dB, when receiving a CRC-OK as a measured channel quality from the transport channel quality measuring units 35 and 351 to 35n.

On the other hand, when receiving a CRC-NG as a measured channel quality from the transport channel quality measuring units 35 and 351 to 35n, the transport channel target SIR updating units 36 and 361 to 36n increase the respective target SIRs for the respective transport channels by 1 dB.

Alternatively, when receiving a CRC-NG as a measured channel quality from the transport channel quality measuring units 35 and 351 to 35n, the transport channel target SIR updating units 36 and 361 to 36n may set different increases/decreases steps or decreases steps for the respective transport channels.

In this case, the transport channel target SIR updating units 36 and 361 to 36n may be configured to set the decreases step, based on the increases/decreases step and required channel qualities of the respective transport channels.

In (1), initial target SIRs for all transport channels are set at 10 dB.

In (2), when the time measured by the target SIR determination timer expires, the target SIR determining unit 34 compares current target SIRs for all transport channels, and determines a target SIR of the highest quality as a target SIR for a received signal.

Here, since one CRC-OK and one CRC-NG are reported on the control transport channel, the target SIR for the control transport channel remains 10 dB.

Also, since three CRC-OKs are reported (no CRC-NG is reported) on a user transport channel 1, the target SIR for the user transport channel 1 is reduced to 7 dB.

Also, since two CRC-OKs are reported (no CRC-NG is reported) on a user transport channel 2, the target SIR for the user transport channel 2 is reduced to 8 dB.

Accordingly, the target SIR determining unit 34 determines 10 dB, which is the target SIR for the control transport channel, as a target SIR for the received signal, and in (3), communicates the target SIR for the received signal (=10 dB) to the base station 2.

In (4), the target SIR determining unit 34 also communicates the target SIR for the received signal (=10 dB) to the respective transport channel target SIR updating units 36 and 361 to 36n. The respective transport channel target SIR updating units 36 and 361 to 36n update the target SIRs for the respective transport channel to the communicated target SIR for the received signal (=10 dB).

In (5), suppose that the channel quality of the control transport channel is below a target channel quality. Here, the target SIR determining unit 34 compares current target SIRs for all transport channels, and determines a target SIR of the highest quality as a target SIR for the received signal.

In the example of FIG. 4, since the target SIR for the control transport channel (=13 dB) is the highest, the target SIR for the control transport channel is determined as a target SIR for the received signal. In (6), the determined target SIR for the received signal (=13 dB) is communicated to the base station 2.

Also, in (7), the target SIRs for the other user transport channels are changed to the target SIR for the received signal (13 dB) communicated to the base station 2. In (7), although the time measured by the target SIR determination timer has not expired yet, the target SIR determination timer is reset.

In (8), when the time measured by the target SIR determination timer expires, as in (2), the target SIR determining unit 34 compares current target SIRs for all transport channel, and determines a target SIR of the highest quality (the target SIR for the user transport channel 1=12 dB) as a target SIR for the received signal.

In (9), the target SIR determining unit 34 communicates the determined target SIR for the received signal (=12 dB) to the base station 2, and at the same time, in (10), communicates it to the respective transport channel target SIR updating units 36 and 361 to 36n. Here, the target SIRs for the respective transport channel are updated to the target SIR for the received signal (=12 dB) communicated to the base station 2.

Hereinafter, with reference to FIG. 5, an operation in the base station 2 according to this embodiment will be described. The base station 2 is configured to implement the operation below in predetermined time slots.

Figure 5:
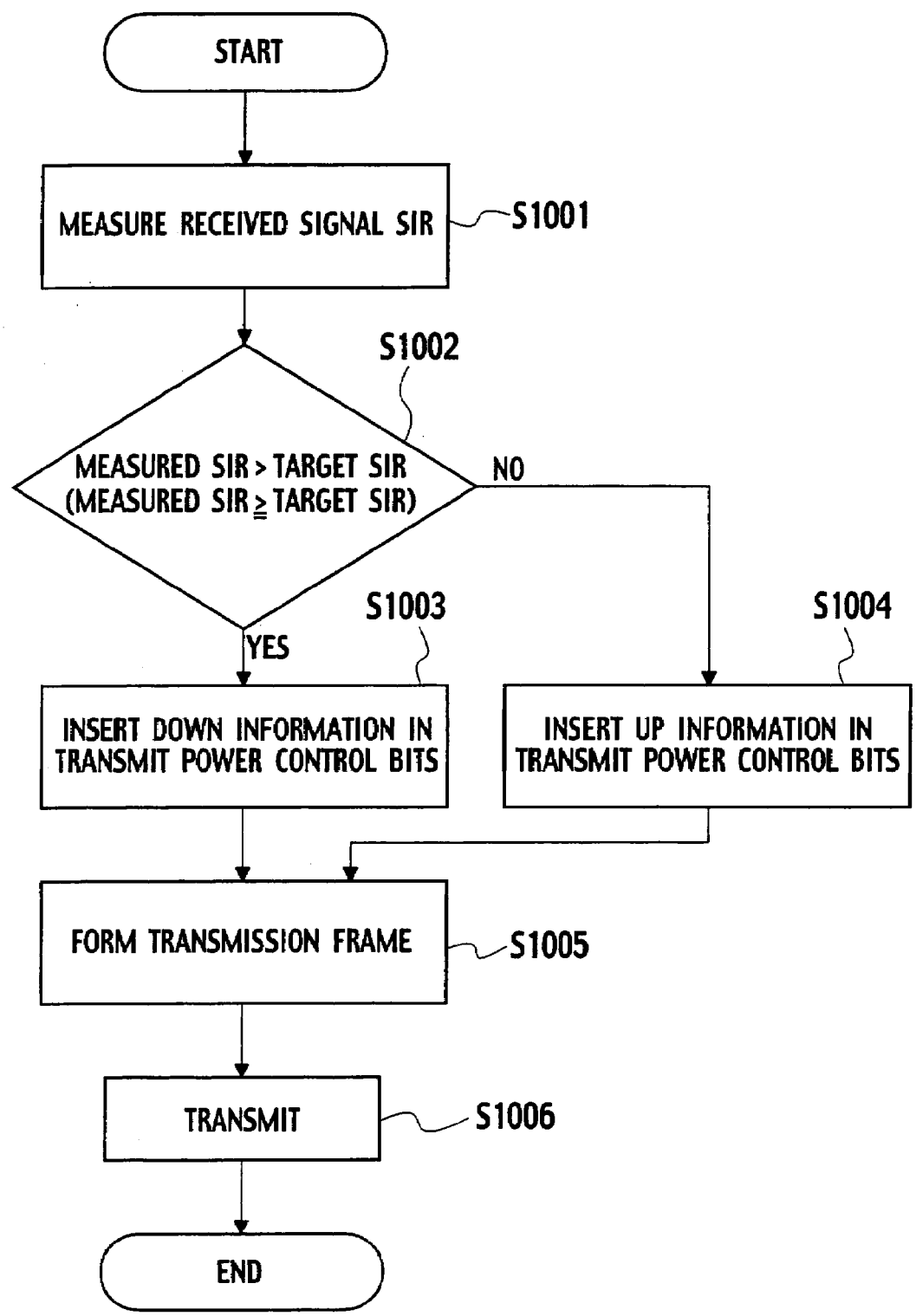
FIG. 5 is a flowchart showing an operation in a base station according to the first embodiment of the present invention.

As shown in FIG. 5, in step S1001, the SIR measuring unit 26 measures the SIR of a received signal amplified at the amplifier unit 21 and subjected to demodulation processing at the demodulator unit 25.

In step S1002, the pattern determining unit 24 compares the SIR measured by the SIR measuring unit 26 with a target SIR for the received signal communicated from the target SIR determining unit 34 of the radio control station 3.

Here, the pattern determining unit 24 keeps the latest target SIR until it receives a new target SIR from the radio control station 3.

When the measured SIR exceeds the target SIR (or the measured SIR is not less than the target SIR), in step S1003, the pattern determining unit 24 determines insertion of down information showing "transmit power down" in transmit power control bits.

On the other hand, when the measured SIR is below the target SIR (or the measured SIR is not more than the target SIR), in step S1004, the pattern determining unit 24 determines insertion of up information showing "transmit power up" in transmit power control bits.

In step S1005, the frame generating unit 23 adds the transmit power control bits determined by the pattern determining unit 24 to data bits to be transmitted, thereby generating a transmission frame.

In step S1006, the modulator unit 22 performs modulation processing on the transmission frame generated by the frame generating unit 23, and the amplifier unit 21 amplifies the transmit power of the transmission frame for transmission to the mobile station 1.

According to this embodiment, when the radio control station measures the channel quality of a control transport channel in a period shorter than a predetermined period, and the channel quality of the control transport channel is below a target channel quality, a target SIR for a received signal is determined and communicated to the base station 2, breaking in the predetermined period. This can keep a load increase in the radio control station to a minimum and also keep the circuit capacity between the radio control station and the base station to a minimum, and an adequate circuit quality can be maintained.

Second Embodiment

Figure 6:
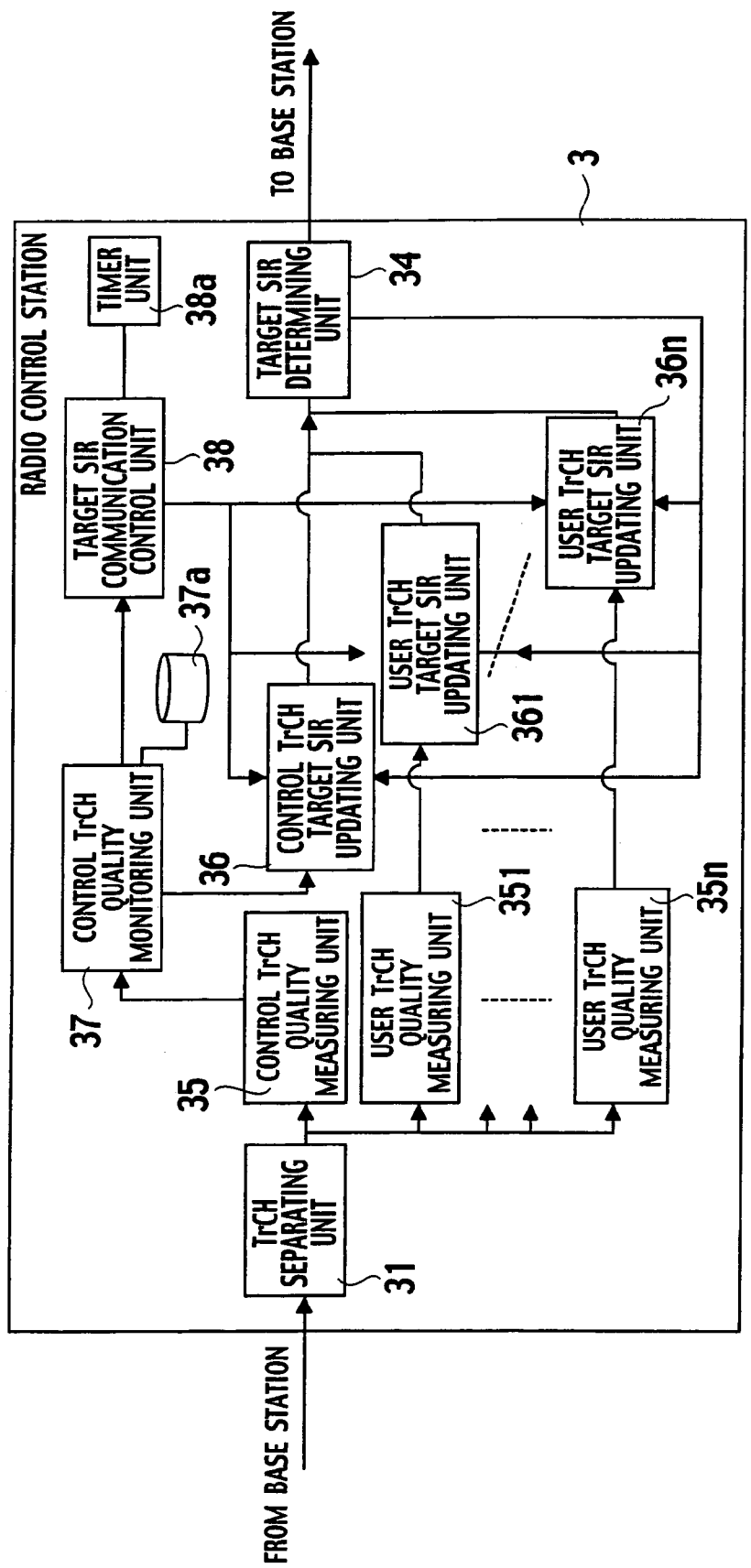
FIG. 6 is a functional block diagram showing the configuration of a radio control station according to a second embodiment of the present invention.
Figure 7:
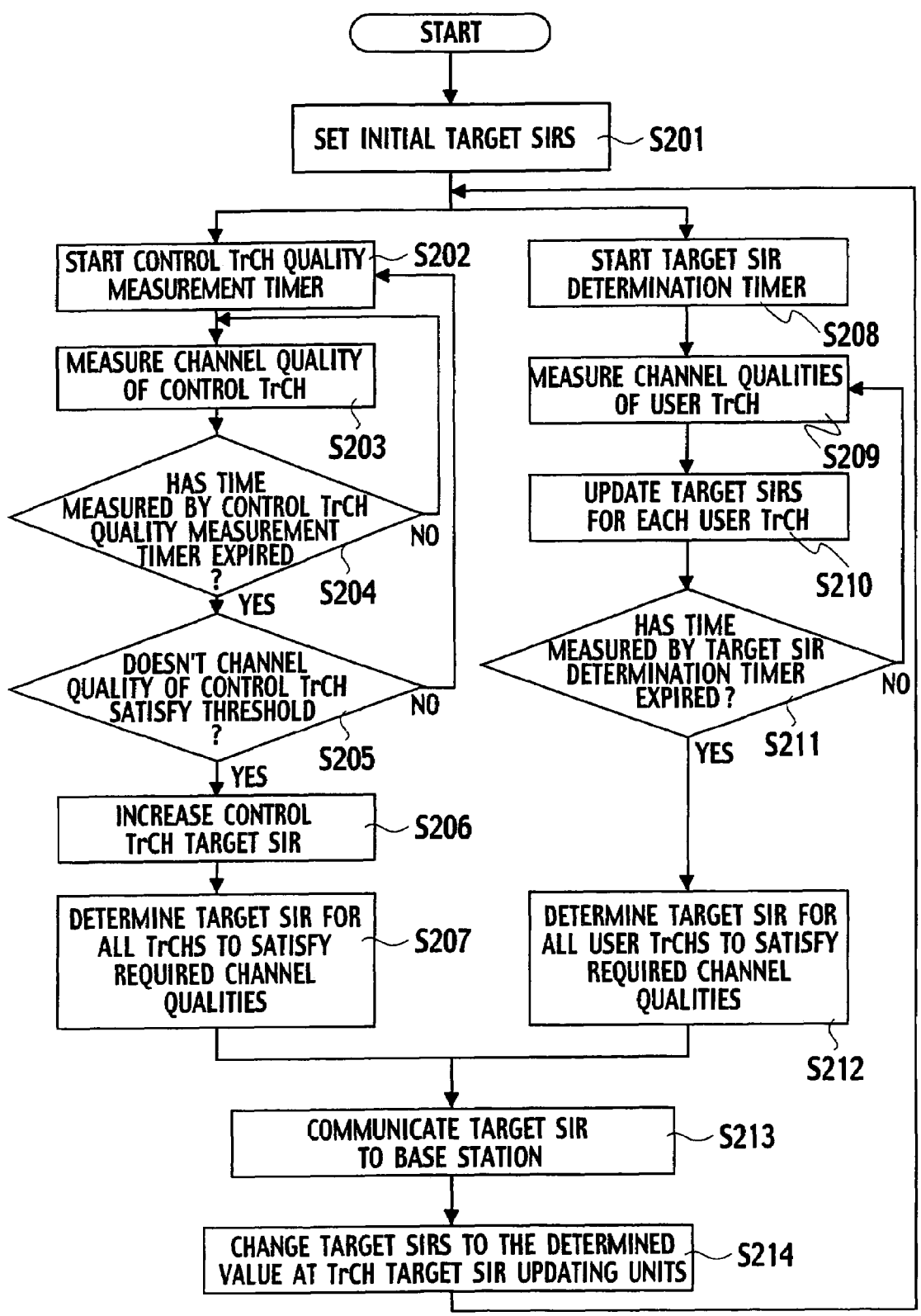
FIG. 7 is a flowchart showing an operation in the radio control station according to the second embodiment of the present invention.

With reference to FIGS. 6 to 8, a second embodiment of the present invention, mainly differences from the above-described first embodiment, will be described. FIG. 6 is a block diagram showing the configuration of a radio control station 3 according to this embodiment.

The radio control station 3 in this embodiment is configured to include a storage unit 37a in addition to the components of the radio control station 3 in the above-described first embodiment. Here, the storage unit 37a is configured to store a predetermined threshold for the channel quality of a control transport channel.

A control transport channel quality monitoring unit 37 in this embodiment includes a control transport channel quality measurement timer, and is configured to monitor, within a time measured by the control transport channel quality measurement timer, the channel quality (the number of CRC-NGs in this embodiment) of a control transport channel measured at a control transport channel quality measuring unit 35.

Here, the time measured by the control transport channel quality measurement timer is set shorter than a time measured by a target SIR determination timer.

Also, the control transport channel quality monitoring unit 37 has the function of comparing the channel quality of a control transport channel with the predetermined threshold.

Specifically, when the number of CRC-NGs received in the control transport channel within the time measured by the control transport channel quality measurement timer exceeds the predetermined threshold, the control transport channel quality monitoring unit 37 instructs the control transport channel target SIR updating unit 36 to increase a target SIR for the control transport channel, and also communicates that fact to a target SIR communication control unit 38.

The target SIR communication control unit 38 is configured to immediately instruct the control transport channel target SIR updating unit 36 to communicate a current target SIR for the control transport channel to a target SIR determining unit 34, according to an instruction from the control transport channel quality monitoring unit 37 even when a predetermined period has not come.

Also, the target SIR communication control unit 38 may be configured to also immediately instruct the respective user transport channel target SIR updating units 361 to 36n to communicate current target SIRs for the respective user transport channels to the target SIR determining unit 34, according to an instruction from the control transport channel quality monitoring unit 37 even when the predetermined period has not come.

Hereinafter, with reference to FIG. 7, an operation in the radio control station of this embodiment will be described.

As shown in FIG. 7, in step S201, the transport channel target SIR updating units 36 and 361 to 36n set initial target SIR values. Here, the initial target SIR values to be set are predetermined for the transport channels by parameters.

Then, the operation divides into a loop for a control transport channel (S202 to S207) and a loop for user transport channels (S208 to S212).

In the loop for the user transport channels, in step S208, a timer unit 38a starts the target SIR determination timer for monitoring the predetermined period.

In step S209, user transport channel quality measuring units 351 to 35n measure the channel qualities of the respective user transport channels.

In step S210, the user transport channel target SIR updating units 361 to 36n compare the measured channel qualities of the respective user transport channels with preset target channel qualities for the respective user transport channels, and update the target SIRs for the respective user transport channels.

In step S211, the target SIR communication control unit 38 determines whether the time measured by the target SIR determination timer within the timer unit 38a has expired or not, that is, whether the predetermined period has come or not.

When the determination is yes ("Y" in step S211), the operation proceeds to step S212. When the determination is no ("N" in step S211), the operation repeats the process of steps S209 to S211 by loop processing.

In step S212, the target SIR communication control unit 38 instructs the respective user transport channel target SIR updating units 361 to 36n to immediately communicate current target SIRs for the respective user transport channels to the target SIR determining unit 34. The target SIR determining unit 34 determines a target SIR for a received signal, based on the communicated target SIRs for the respecitive user transport channels, so that the channel qualities of all user transport channels satisfy required channel qualities.

On the other hand, in the loop for the control transport channel, in step S202, the control transport channel quality monitoring unit 37 starts the control transport channel quality measurement timer.

In step S203, the control transport channel quality measuring unit 35 measures the channel quality (the number of CRC-NGs) of the control transport channel.

In step S204, the control transport channel quality monitoring unit 37 determines whether the time measured by the control transport channel quality measurement timer has expired or not.

When the determination is yes ("Y" in step S204), the operation proceeds to step S205. When the determination is no ("N" in step S204), the operation repeats the process of steps S203 to S204 by loop processing.

In step S205, the control transport channel quality monitoring unit 37 determines whether the number of CRC-NGs measured by the control transport channel quality measuring unit 35 exceeds the predetermined threshold (number of CRC-NGs) stored in the storage unit 37a or not.

When the determination is yes ("Y" in step S205), the operation proceeds to step S206. On the other hand, when the determination is no ("N" in step S205), the control transport channel quality measurement timer is reset, and the operation returns to step S202.

In step S206, the control transport channel quality monitoring unit 37 communicates the fact that the measured number of CRC-NGs exceeds the predetermined threshold to the control transport channel target SIR updating unit 36 and the target SIR communication control unit 38, and the control transport channel target SIR updating unit 36 increases a control transport channel target SIR.

In step S207, the target SIR communication control unit 38 instructs the respective transport channel target SIR updating units 36 and 361 to 36n to immediately communicate current target SIRs for the respective transport channels to the target SIR determining unit 34. The target SIR determining unit 34 determines a target SIR for the received signal, based on the communicated target SIRs for the respective transport channels, so that the channel qualities of all transport channels satisfy required channel qualities.

In step S213, the target SIR determining unit 34 communicates the determined target SIR for the received signal to the base station 2, and also communicates the target SIR for the received signal to the respective transport channel target SIR updating units 36 and 361 to 36n In step S214, the transport channel target SIR updating units 36 and 361 to 36n update the respective transport channel target SIRs, based on the communicated target SIR.

With reference to FIG. 8, an example of update transitions of target SIRs for the respective transport channels in this embodiment under the same conditions as in the example of FIG. 4 will be illustrated. In the example of FIG. 8, the predetermined threshold is "2."

In (1), initial target SIRs for all transport channels are set at 10 dB.

In (2), although the time measured by the control transport channel quality measurement timer has expired, since the number of CRC-NGs measured by the control transport channel quality measuring unit 35 does not exceed the predetermined threshold ("2"), nothing is done.

In (3), since the time measured by the target SIR determination timer has expired, the target SIR determining unit 34 compares current target SIRs for all transport channels, and determines a target SIR of the highest quality as a target SIR for a received signal.

Here, since three CRC-OKs are reported on a user transport channel 1 (no CRC-NG is reported), the target SIR for the user transport channel 1 is reduced to 7 dB.

Also, since two CRC-OKs are reported on a user transport channel 2 (no CRC-NG is reported), the target SIR for the user transport channel 2 is reduced to 8 dB.

Accordingly, the target SIR determining unit 34 determines 8 dB, which is the target SIR for the user transport channel 2, as a target SIR for the received signal, and in (4), communicates the target SIR for the received signal (=8 dB) to the base station 2.

Also, in (5), the target SIR determining unit 34 communicates the target SIR for the received signal (=8 dB) to the respective transport channel target SIR updating units 36 and 361 to 36n. The respective transport channel target SIR updating units 36 and 361 to 36n update the target SIRs for the respective transport channel to the communicated target SIR for the received signal (=8 dB).

At this time, although the time measured by the control transport channel quality measurement timer has not expired yet, the control transport channel quality measurement timer is reset.

In (6), suppose that the time measured by the control transport channel quality measurement timer has expired, and the number of CRC-NGs measured by the control transport channel quality measuring unit 35 exceeds the predetermined threshold ("2").

Here, the target SIR determining unit 34 determines 9 dB, which is the target SIR for the control transport channel, as a target SIR for the received signal, so as to satisfy the channel qualities of all transport channels, and in (7), communicates the target SIR for the received signal (=9 dB) to the base station 2.

When it is determined that the number of CRC-NGs measured by the control transport channel quality measuring unit 35 exceeds the predetermined threshold ("2"), the target SIR for the control transport channel is increased from 8 dB to 9 dB.

Also, in (8), the target SIR determining unit 34 communicates the target SIR for the received signal (=9 dB) to the respective user transport channel target SIR updating units 361 to 36n. The respective user transport channel target SIR updating units 361 to 36n update the target SIRs for the respective user transport channels to the communicated target SIR for the received signal (=9 dB).

At this time, although the time measured by the target SIR determination timer has not expired yet, the target SIR determination timer is reset.

In (9), although the time measured by the control transport channel quality measurement timer has expired, since the number of CRC-NGs measured by the control transport channel quality measuring unit 35 does not exceed the predetermined threshold ("2"), nothing is done.

In (10), since the time measured by the target SIR determination timer has expired, the target SIR determining unit 34 compares current target SIRs for all transport channels, and determines a target SIR of the highest quality as a target SIR for the received signal.

Here, since two CRC-OKs and one CRC-NG are reported on the user transport channel 1, the target SIR for the user transport cannel 1 is reduced to 8 dB.

Also, since three CRC-OKs are reported (no CRC-NG is reported) on the user transport channel 2, the target SIR for the user transport cannel 2 is reduced to 6 dB.

Accordingly, the target SIR determining unit 34 determines 8 dB, which is the target SIR for the user transport channel 1, as a target SIR for the received signal, and in (11), communicates the target SIR for the received signal (=8 dB) to the base station 2.

Also, in (12), the target SIR determining unit 34 communicates the target SIR for the received signal (=8 dB) to the respective transport channel target SIR updating units 36 and 361 to 36n. The respective transport channel target SIR updating units 36 and 361 to 36n update the target SIRs for the respective transport channel to the communicated target SIR for the received signal (=8 dB).

At this time, although the time measured by the control transport channel quality measurement timer has not expired yet, the control transport channel quality measurement timer is reset.

According to this embodiment, when a measured number of CRC-NGs exceeds a predetermined threshold, the control transport channel target SIR updating unit 36 increases a target SIR for the control transport channel, and a target SIR for the received signal updated based on the target SIR for the control transport channel is immediately communicated to the base station. Therefore, even when the amount of control data flowing in the control transport channel is small, deterioration in the channel quality of the control transport channel can be coped with in real time.

Although the present invention has been described in detail using the embodiments above, it is obvious for those skilled in the art that the present invention is not limited to the embodiments described in the present application. The devices in the present invention can be implemented as modified and altered embodiments without departing from the spirit and scope of the present invention as defined by the description of the claims. Accordingly, the description in the present application is for illustrative purposes, and is not meant to limit the present invention.

INDUSTRIAL APPLICABILITY

According to the present invention, a controller equipment and a radio communication method can be provided with which, in the case where a radio control station communicates a target SIR in outer loop transmit power control to a base station in predetermined periods, not in real time, an adequate circuit quality can be maintained with a minimum increase in the load of the radio control station and a minimum increase in the circuit capacity between the radio control station and the base station.

The invention claimed is:

1. A controller equipment for determining a target circuit quality for a received signal used in an outer loop transmit power control, comprising:

a measuring unit configured to measure channel qualities of a control channel and a user channel separated from the received signal;

an updating unit configured to update target circuit qualities for the control channel and the user channel, based on results of measurement of the channel qualities by the measuring unit; and a target circuit quality determining unit configured to determine, in a predetermined period, the target circuit quality for the received signal, based on the target circuit qualities for the control channel and the user channel updated by the updating unit, so that all of the control channel and the user channel satisfy a required channel quality; wherein, when the channel quality of the control channel does not satisfy the required channel quality, the target circuit quality determining unit is configured to determine the target circuit quality for the received signal, based on at least the target circuit quality for the control channel, even when the predetermined period has not yet finished.

2. The controller equipment as set forth in claim 1, wherein the communicating unit is configured to compare the channel quality of the control channel with a predetermined threshold in a period shorter than the predetermined period, and the target circuit quality determining unit is configured to determine the target circuit quality for the received signal, based on the target circuit quality for the control channel updated based on a result of the comparison.

3. The controller equipment as set forth in claim 1, wherein:

when the channel quality of the control channel does not satisfy the required channel quality, the target circuit quality determining unit is configured to determine the target circuit quality for the received signal, based on the target circuit qualities for the control channel and the user channel, even when the predetermined period has not yet finished.

4. A method for determining a target circuit quality for a received signal used in an outer loop transmit power control, comprising:

measuring channel qualities of a control channel and a user channel separated from a received signal;

updating target circuit qualities for the control channel and the user channel, based on results of measurement of the channel qualities; and determining, in a predetermined period, the target circuit quality for the received signal, based on the target circuit qualities for the control channel and the user channel, so that all of the control channel and the user channel satisfy a required channel quality; wherein, when the channel quality of the control channel does not satisfy the required channel quality, determining the target circuit quality for the received signal, based on at least the target circuit quality for the control channel, even when the predetermined period has not yet finished.

5. The method of claim 4 further comprising:

comparing the channel quality of the control channel with a predetermined threshold in a period shorter than the predetermined period; and determining the target circuit quality for the received signal, based on the target circuit quality for the control channel updated based on a result of the comparison.

6. The method of claim 4 further comprising:

when the channel quality of the control channel does not satisfy the required channel quality, determining the target circuit quality for the received signal, based on the target circuit qualities for the control channel and the user channel, even when the predetermined period has not yet finished.

7. A controller equipment for determining a target circuit quality for a received signal used in an outer loop transmit power control, comprising:
   means for measuring channel qualities of a control channel and a user channel separated from a received signal;
   means for updating target circuit qualities for the control channel and the user channel, based on results of measurement of the channel qualities by the means for measuring channel qualities and
   means for determining, in a predetermined period, the target circuit quality for the received signal, based on the target circuit qualities for the control channel and the user channel updated by the means for updating, so that all of the control channel and the user channel satisfy a required channel quality; wherein,
   when the channel quality of the control channel does not satisfy the required channel quality, the means for determining a target circuit quality determines the target circuit quality for the received signal, based at least on the target circuit quality for the control channel, even when the predetermined period has not yet finished.

8. The controller equipment as set forth in claim 7, wherein:
   the communicating means compares the channel quality of the control channel with a predetermined threshold in a period shorter than the predetermined period, and the means for determining determines the target circuit quality for the received signal, based on the target circuit quality for the control channel updated based on a result of the comparison.

9. The controller equipment as set forth in claim 7, wherein:
   when the channel quality of the control channel does not satisfy the required channel quality, the target circuit quality determining means determines the target circuit quality for the received signal, based on the target circuit qualities for the control channel and the user channel, even when the predetermined period has not yet finished.

* * * * *